Patented Dec. 27, 1949

2,492,644

UNITED STATES PATENT OFFICE 2,492,644

PROCESS FOR MAKING 2,5-DICHLOROTHIOPHENE

George C. Johnson, Woodbury, N. J., assignor to Socony-Vacuum Oil Company, Incorporated, a corporation of New York No Drawing. Application May 29, 1947, Serial No. 751,463

6 Claims. (Cl. 260—329)

This invention relates to an improved method for preparing 2,5-dichlorothiophene.

This compound has heretofore been prepared by the direct chlorination of thiophene at room temperature and subsequent isolation thereof from the resulting crude thiophene-chlorine reaction mixture. The direct reaction between thiophene and chlorine proceeds easily and rapidly under normal conditions to yield a mixture comprising unreacted thiophene, monochlorothiophene, dichlorothiophenes, trichlorothiophenes, tetrachlorothiophene and chlorine addition products of thiophene.

To obtain a separation of the various chlorothiophenes, the method developed over sixty years ago and accredited to Victor Meyer has heretofore generally been employed. This method involves heating the crude chlorination reaction mixture with potassium hydroxide for several hours to destroy addition products formed during the course of reaction, followed by addition of water and subsequent steam distillation and fractionation of the mixture so obtained to yield the various chloropthiophenes. Subsequent modifications of this procedure have involved removal of excess alkali and alkali chloride present after the heating period either by decantation, filtration, or water-washing and distillation of the remaining liquid product containing chlorothiophenes either at atmospheric or reduced pressure.

The dichlorothiophene fraction obtained as a result of the above procedures consists of 2,5-dichlorothiophene, 2,3-dichlorothiophene, 2,4-dichlorothiophene, and 3,4-dichlorothiophene. Since these compounds have fairly close boiling points, the isolation of 2,5-dichlorothiophene from the other dichlorothiophenes, which are present in amounts up to 30 to 40 per cent by volume, is accomplished only by extremely efficient fractional distillation. The problem involved in separating substantially pure 2,5-dichlorothiophene from the other dichlorothiophenes may be more fully realized by an examination of the boiling points of these compounds as set forth below:

| Compound: | Boiling point °C. |
|---|---|
| 2,5-dichlorothiophene | 162.1 |
| 2,4-dichlorothiophene | 167.6 |
| 2,3-dichlorothiophene | 172.7 |
| 3,4-dichlorothiophene | 182.0 |

It will thus be seen that 2,5-dichlorothiophene, 2,4-dichlorothiophene and 2,3-dichlorothiophene have boiling point differences of the order of 5° C. In order to effectively separate pure 2,5-dichlorothiophene in admixture with the others, repeated fractionations have generally been found to be necessary. By very efficient fractional distillation, for example, with a 90–95 theoretical plate distillation column, the reaction mixture of dichlorothiophenes has been resolved into its components. However, such a separation step is accomplished, as will be realized, only at considerable expense. Fractionation as a means for resolving the dichlorothiophene fraction is hence not at all feasible for the efficient production of 2,5-dichlorothiophene in commercial quantities.

In accordance with the present invention, there has now been discovered a method of preparing 2,5-dichlorothiophene which tends to overcome the difficulties existent in the process heretofore employed. By carrying out the process of this invention, it has been found that the dichlorothiophene fraction is inherently substantially pure 2,5-dichlorothiophene and that no distillation difficulties attend its separation. Broadly stated, the process contemplated herein comprises reacting 2-chlorothiophene with chlorine, heating the resulting reaction product mixture in the presence of alkali to decompose the chlorine addition products formed and distilling the resultant mixture to obtain a dichlorothiophene fraction consisting essentially of pure 2,5-dichlorothiophene.

It has been found by contacting 2-chlorothiophene with chlorine, preferably in slight molar excess and then heating the product mixture with alkali and distilling, that a comparatively simple, inexpensive method for synthesizing 2,5-dichlorothiophene is provided. Moreover, the process of this invention permits higher yields of 2,5-dichlorothiophene per mole of thiophene initially employed in preparing the 2-chlorothiophene than the methods of the prior art. This increased yield in product causes a substantial reduction in expenditure required per unit of 2,5-dichlorothiophene obtained and hence gives rise to a highly economical and efficient method of production.

It is accordingly an object of the present invention to provide an effective process for preparing 2,5-dichlorothiophene wherein the distillation difficulties prevalent in the prior art procedure for separation of the dichloropthiophene fraction resulting upon chlorination of thiophene have been overcome. A further object is to afford a process for obtaining essentially pure 2,5-dichlorothiophene. A still further object is the provision of a comparatively simple economical method for making 2,5-dichlorothiophene, which requires less apparatus and attention than has been necessary in the prior art procedure.

These and other objects which will be recognized by those skilled in the art are attained in accordance with the present invention wherein 2,5-dichlorothiophene is prepared by contacting 2-chlorothiophene with chlorine and thereafter maintaining the resulting reaction mixture at an elevated temperature in the presence of alkali to decompose substantially all of the addition products resulting during the aforesaid chlorination. Fractionation of the mixture so obtained yields substantially pure 2,5-dichlorothiophene. Infrared absorption measurements have indicated that the dichlorothiophene fraction is composed of 98–100 per cent 2,5-dichlorothiophene and 0–2 per cent 2,3-dichlorothiophene without even the merest trace of 2,4-dichlorothiophene or 3,4-dichlorothiophene.

The 2-chlorothiophene reactant employed in the present process may be obtained from any source. Generally, however, the 2-chlorothiophene is prepared by the reaction of thiophene with chlorine gas, treatment of the crude product with alkali to decompose chlorine addition products and finally distillation to recover 2-chlorothiophene. This distillation is readily performed, since 2-chlorothiophene may be separated easily from any unreacted thiophene (44.2° C. difference in boiling point) and from any 2,5-dichlorothiophene formed (33.8° C. difference in boiling point). Furthermore, the latter separation need be made with no particular sharpness as the inclusion of 2,5-dichlorothiophene in the 2-chlorothiophene will do no harm. The monochlorothiophene obtained by the above procedure is substantially pure 2-chlorothiophene with no more than a few tenths of one per cent of 3-chlorothiophene, the only other possible monochloro derivative. As an alternate method of preparing 2-chlorothiophene, the alkali treatment of the crude reaction product may be omitted and the product directly distilled under vacuum to obtain a cut rich in 2-chlorothiophene.

The chlorination of 2-chlorothiophene in accordance with the present invention will generally be carried out in the temperature range of from about -20° C. to about 150° C. As the chlorination reaction proceeds by the addition of gaseous chlorine to the monochlorothiophene, the temperature of the reaction mixture rises. It has, however, been found desirable to maintain the temperature of the reaction mixture below about 50° C. during chlorination. This can be effectively accomplished by water-cooling the vessel in which chlorination is taking place or by other suitable cooling means known to the art. Ordinarily, chlorine will be bubbled into 2-chlorothiophene at a rate which will insure thorough mixing and contact of the two reactants. While an equimolar ratio of 2-chlorothiophene to chlorine can be employed in bringing about the desired results, it is desirable to use a slight molar excess of chlorine per mole of 2-chlorothiophene under treatment.

At the completion of the chlorination reaction, the resulting mixture is brought into contact with alkali and the mixture is maintained at an elevated temperature for a period sufficient to decompose the chlorine addition products produced during the course of chlorination. The temperature during this period will generally be between about 90° C. and about 200° C. and preferably between about 100° C. and about 125° C. The optimum heating period may be readily established for a particular degree of chlorination. Under the usual conditions contemplated by the process of this invention, the period of heating will ordinarily lie between about 1 hour and about 24 hours. The time of heating of the chlorinated mixture may be reduced by passing a stream of an inert gas through the mixture during the heating period. Any of the commonly employed alkaline materials may be used for aiding in the decomposition of the chlorine addition products in the reaction mixture. Generally, an oxide, hydroxide or carbonate of the alkali or alkaline earth metals will be employed, preferably sodium hydroxide, potassium hydroxide or a mixture of the two.

When the heating period is completed, solid matter present consisting essentially of excess alkali and salts thereof is removed by filtration, decantation, water-washing, or other suitable means. The mixture is then fractionated to yield a dichlorothiophene fraction consisting of substantially pure 2,5-dichlorothiophene. As an alternate process the mixture may be steam-distilled without prior removal of salt and excess alkali.

The following example is illustrative of the results contemplated by the present invention:

*Example I*

Pure 2-chlorothiophene (B. P. 128.1, $n_D^{20}$= 1.5487) was chlorinated at 50° C. with a slight molar excess of chlorine at a rate of about 18 liters of chlorine per hour per gram mole of 2-chlorothiophene. The temperature was maintained at 50° C. by means of an ice bath. Addition products were decomposed by heating the reaction product for about 24 hours at 100–125° C. with 0.5 mole of sodium hydroxide and 0.5 mole of potassium hydroxide per mole of chlorinated thiophene. After filtering off the excess alkali and salts, the dichlorothiophene fraction was distilled. A large fraction of 2,5-dichlorothiophene (B. P. 162.1, $n_D^{20}$=1.5626) was obtained. A sharp rise in temperature occurred from 162.1 to 198.7, the boiling point of 2,3,5-trichlorothiophene. This indicates that there was no substantial amount of other dichlorothiophenes present. The content of the 2,5-dichlorothiophene was found by infra-red absorption measurements to be in excess of 98 per cent by volume of the dichlorothiophene fraction.

From the above it will be seen that the dichlorothiophene fraction obtained in accordance with the process of this invention is substantially pure 2,5-dichlorothiophene and that the same is readily obtained without the distillation difficulties inherent in the prior art procedure wherein dichlorothiophenes other than 2,5-dichlorothiophene were present in amounts of the order of 30–40 per cent by volume, as shown by the following example, illustrative of the previously employed process entailing direct chlorination of thiophene.

*Example II*

Thiophene was chlorinated at 50° C. with one mole of chlorine per mole of thiophene. The temperature was maintained at 50° C. by an ice bath. The crude reaction product was heated for about 16 hours at about 100° C. with a mixture of equal parts by weight of sodium hydroxide and potassium hydroxide equivalent to 0.2 mole of alkali per mole of thiophene. Salts and unreacted alkali were removed by filtration, and the filtered product was distilled. The distillation fractions were analyzed by boiling points, by refractive index measurements and by infra-red absorption spectrograms. The composition of the dichlorothiophene fraction was 2,5-dichlorothiophene, 63.2 per cent by volume; other dichlorothiophenes, 36.8 per cent by volume. 2,4-dichlorothiophene, 2,3-dichlorothiophene and 3,4-dichlorothiophene were each present in substantial amounts.

I claim:

1. A process for preparing substantially pure 2,5-dichlorothiophene, comprising reacting a reaction mass consisting of chlorine and 2-chlorothiophene, heating the resulting reaction product mixture in the presence of alkali to decompose chlorine addition products formed therein as a result of the aforesaid reaction and distilling the mixture so obtained to yield a dichlorothiophene fraction consisting essentially of 2,5-dichlorothiophene.

2. A process for preparing substantially pure 2,5-dichlorothiophene, comprising reacting a reaction mass consisting of chlorine and 2-chlorothiophene, heating the resulting reaction product mixture in the presence of alkali to decompose chlorine addition products formed therein as a result of the aforesaid reaction, removing solid matter from the resulting solution and distilling the same to yield a dichlorothiophene fraction consisting essentially of 2,5 - dichloro - thiophene.

3. A process for preparing substantially pure 2,5-dichlorothiophene, comprising reacting a reaction mass consisting of chlorine and 2-chlorothiophene, heating the resulting reaction product mixture at a temperature between about 100° C. and about 125° C. in the presence of alkali to decompose chlorine addition products formed therein as a result of the aforesaid reaction and distilling the mixture so obtained to yield a dichlorothiophene fraction consisting essentially of 2,5-dichlorothiophene.

4. A process for preparing substantially pure 2,5-dichlorothiophene, comprising reacting chlorine with substantially pure 2-chlorothiophene, maintaining the temperature of the reaction mixture below about 50° C. during chlorination, heating the resulting reaction product mixture in the presence of alkali to decompose chlorine addition products formed therein as a result of the aforesaid reaction and distilling the mixture so obtained to yield a dichlorothiophene fraction consisting essentially of 2,5-dichlorothiophene.

5. A process for preparing substantially pure 2,5-dichlorothiophene, comprising reacting chlorine with substantially pure 2-chlorothiophene, maintaining the temperature of the reaction mixture below about 50° C. during chlorination, heating the resulting reaction product mixture at a temperature between about 100° C. and about 125° C. in the presence of alkali to decompose chlorine addition products formed therein as a result of the aforesaid reaction and distilling the mixture so obtained to yield a dichlorothiophene fraction consisting essentially of 2,5-dichlorothiophene.

6. A process for preparing substantially pure 2,5-dichlorothiophene, comprising reacting substantially pure 2-chlorothiophene with an excess of chlorine, maintaining the temperature of the reaction mixture below about 50° C. during chlorination, heating the resulting reaction product mixture at a temperature between about 100° C. and about 125° C. in the presence of an alkali metal hydroxide to decompose chlorine addition products formed therein as a result of the aforesaid reaction, removing solid matter from the resulting solution and distilling the same to yield a dichlorothiophene fraction consisting essentially of 2,5-dichlorothiophene.

GEORGE C. JOHNSON.

REFERENCES CITED

The following references are of record in the file of this patent:

Ber. 17, 794–5 (1884).
Ber. 19, 650 (1886).
Coonradt, J. Am. Chem. Soc. 70, 2565 (1948).
Weygand, "Organic Preparations," pages 51 and 71, Interscience Publishers, 1945.